April 28, 1925.
F. O. RACE
1,535,543
EXTENSION BIT HOLDER
Filed Oct. 16, 1922
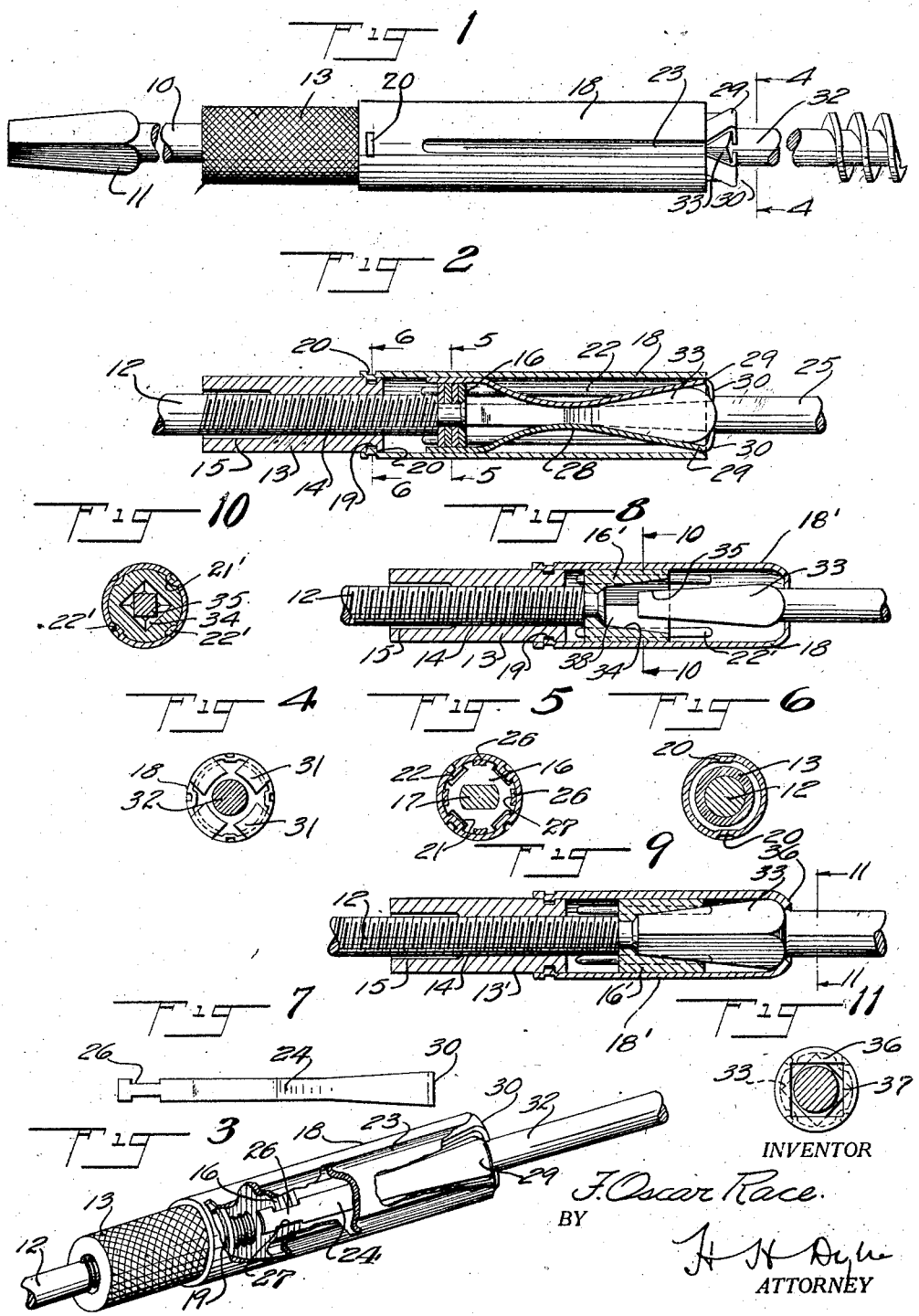
INVENTOR
F. Oscar Race.
BY
ATTORNEY Patented Apr. 28, 1925.

1,535,543

UNITED STATES PATENT OFFICE.

FRED OSCAR RACE, OF HILLSIDE, NEW JERSEY.

EXTENSION-BIT HOLDER.

Application filed October 16, 1922. Serial No. 594,760.

*To all whom it may concern:*

Be it known that I, FRED OSCAR RACE, a citizen of the United States, and a resident of Hillside, county of Union, and State of New Jersey, have invented a new and useful Improvement in Extension-Bit Holders, of which the following is a specification.

My invention relates to an extension bit holder for use by electricians and others, which is of extreme simplicity and cheapness, readily manufactured and highly effective in operation, and is of extremely slender proportions so as to avoid objectionable bulkiness common to holders heretofore used for such purpose.

Other objects of the invention will appear from the following description.

In the drawings I have shown certain embodiments of the invention, but it is to be understood that same are only for illustration and for affording an understanding of the invention and not for limitation thereof.

In said drawings, Fig. 1 is a side view showing the extension bit inserted in the holder and ready to be clamped therein. Fig. 2 is a longitudinal section of the device shown in Fig. 1, the bit being clamped in place in the holder. Fig. 3 is a perspective view with parts broken away, the relation of parts being the same as in Fig. 2. Fig. 4 is a cross-sectional view on line 4—4, Fig. 1. Figs. 5 and 6 are cross-sectional detail views taken respectively on the lines 5—5 and 6—6 of Fig. 2. Fig. 7 is a plan view of one of the spring clamping fingers for the holder shown in Figs. 1–6. Fig. 8 is a longitudinal sectional view of a modified form of holder, dispensing with the use of spring fingers, with a bit inserted in the holder to be clamped in place therein. Fig. 9 is a view similar to Fig. 8 with the bit clamped in place. Fig. 10 is a transverse section on line 10—10, Fig. 8, and Fig. 11 is a transverse section on line 11—11, Fig. 9.

The rod or stem 10 has a shank 11 adapted to be inserted in an ordinary brace. Said stem 10 is threaded at its outer end 12 and such threaded portion is provided with an elongated, preferably cylindrical knurled nut 13, which preferably has the portion 14 of its bore screw threaded, and the portion 15 thereof somewhat enlarged in order to relieve this portion of the bore and to avoid making the screw threaded bore portion of unduly great length. At the outer end of said stem 10, same is provided with a head 16, which is securely fastened in place in such manner as to provide a rigid connection and avoid turning of the head relative to the rod 10. Such connection may be formed, for example, by forming the extreme end of the rod 10 into a flat sided rivet 17, as shown in Fig. 5. The head 16 is here shown as made up of a plurality of thin punchings of sheet metal, which is a simple and convenient way to construct the head, but such head may be otherwise formed, if desired, as by being made from a single piece of thicker material.

An elongated slender tubular sleeve 18 is provided in which the head 16 is inserted and said sleeve 18 also extends over a portion of the nut 13 and is connected therewith in a manner to permit nut 13 to be turned with respect to sleeve 18 and at the same time longitudinal movement of the nut 13 is transmitted to the sleeve 18. In the form shown, such connection is secured by providing the nut 13 with a terminal groove 19 and indenting the two opposite portions 20, 20 of sleeve 18, so that same enter the groove 19 at opposite sides thereof, as shown clearly in the cross sectional view of Fig. 6.

Provision is made for enabling the sleeve 18 to have a sliding movement on the head 16 and at the same time to prevent relative rotative movement between these parts. In the form shown, the head 16 is provided with four equally spaced longitudinally extending grooves 21, arranged 90 degrees apart throughout the circumference thereof, and the sleeve 18 is provided with four inwardly extending splines 22 adapted to enter the grooves 21. Splines 22 are preferably formed by striking inwardly the sheet metal material of the sleeve 18, leaving the groove portions 23 on the exterior of sleeve 18. Said inwardly extending spline members 22 also have the additional function of keeping the spring fingers 24, provided to clamp the extension bit 25, properly spaced apart. Said spring fingers 24 have a reduced portion 26 at the inner end thereof, and said reduced portions 26 are received in slots 27 provided to receive same in the head 16 and spaced equidistant intermediate the spline members 22, said spring fingers being held seated in the notches 27 by means of the encircling sleeve 18. Such spring fingers 24 are inwardly bowed at the center portions thereof as shown at 28, 28 and diverge at their outer ends 29, 29 and are provided at such outer ends with inwardly turned jaws 30, 30, which are rounded out as shown at 31, 31, Fig. 4, in order to fit closely about the stem 32 of the extension bit 25 when drawn together.

The operation of the holder shown in Figs. 1–7 will be readily understood from the foregoing. When the extension bit is to be inserted, nut 13 is screwed back on the stem 10, carrying the sleeve 18 with it, and permitting the fingers 24 to project therebeyond, as shown in Fig. 1. The bit being inserted, nut 13 is screwed in the opposite direction, thereby pushing the sleeve 18 outwardly over the spring fingers 24, forcing such spring fingers together and securely clamping the bit 25. In the clamped position, it will be seen that the bit is firmly held against turning as each of the clamping fingers 24 engaging same is confined between the splines 22 on the opposite sides thereof, thereby preventing any rotation of the bit and clamping means within the sleeve 18. Release of the bit is secured by turning the nut 13 to move the sleeve 18 inwardly on the stem 10, whereupon the spring fingers 24, being freed, spring outwardly and separate from one another, permitting the bit shank 33 to be readily and easily withdrawn, and avoiding any binding or holding action at such times.

In the modification of Figs. 8—11, the spring fingers 24 are dispensed with and the head 16' is elongated and provided with a four sided tapered recess 34 to receive the butt end 35 of the bit shank 33. The sleeve 18' is provided with splines 22' which enter notches 21' in the head 16', thereby permitting sleeve 18' to move longitudinally with respect to head 16', but preventing relative rotary movement of such parts. The outer end of sleeve 18' is of a formation adapted to permit the bit shank 33 to be inserted therein, but to prevent outward movement of said bit shank with respect to bit 32 after same has been turned somewhat on its axis. In the form shown, the outer end of sleeve 18' is provided with inwardly turned lips 36, leaving a square opening 37 therebetween just large enough to admit the squared portion 33 of the bit. Said lip portions 36 are of substantially arcuate form when viewed from the outer end of the sleeve 18' and serve to prevent the bit shank from moving out of the sleeve 18' when same is turned axially through one-eighth of a revolution into the dotted line position of Fig. 11. The screwed tapered recess 34 in head 16' has its squared faces 38 so arranged that when the bit shank 33 is seated therein the squared sides of the shank occupy the dotted line position of Fig. 11 and the shank is prevented from moving outwardly with respect to the sleeve 18' by the arcuate lip portions 36. When the nut 13' is screwed back to the position shown in Fig. 8 it is readily possible to insert the extension bit 32 in place, its square shank 33 passing through the square opening 37 provided for the purpose, whereupon it can readily be given a one-eighth turn from the position shown in Fig. 8 to the rotative position shown in Fig. 9, and upon nut 13' being screwed inwardly, the shank 33 becomes firmly seated in the squared recess provided therefor in the head 16', and is firmly and securely clamped in place, the parts occupying the relative position shown in Fig. 9.

It is to be understood that the illustrative embodiments of my invention shown herewith are intended only for affording an understanding of the invention and that changes and modifications may be resorted to within the scope of my claims by which the invention is defined, without departing from my invention.

I claim:

1. In an extension bit holder, a screw threaded stem adapted to be inserted in a brace, a nut on the screw threaded part thereof, a head rigidly secured to the outer end of the stem, said head having two sets of grooves therein, a sleeve having inwardly extending splines adapted to enter one set of said grooves, said sleeve having means of connection to the nut so that longitudinal movement of the latter is communicated to the former, a plurality of spring clamping fingers received and held in the second set of grooves in said head and also received between and held from turning by said splines, said spring fingers having clamping jaws adapted to clamp an extension bit within said sleeve.

2. In an extension bit holder, a stem adapted to be held in a brace and screw threaded near its outer end, a nut on the screw threaded part having a cylindrical peripherally grooved portion near its outer end, a head rigidly secured on the outer end of the stem and having two sets of grooves therein, the grooves in the two sets being arranged to alternate with one another, an elongated sleeve slidable on the head and having a plurality of spaced splines struck inwardly therefrom to enter and run in one of the sets of grooves in the head, said sleeve extending over the nut and having inwardly extending portions to enter the groove therein; a plurality of spring fingers having reduced portions entering the second set of grooves in the head and held thereon between the head and the inner wall of the sleeve, said fingers being normally spring tensioned to separate from one another and thereby tend to expand at their outer ends and being received between and held from turning with respect to the sleeve by the splines thereof, and inwardly extending jaws formed on said fingers in the neighborhood of the open end of the sleeve to clamp and hold an extension bit with its shank in the sleeve and its stem projecting therefrom.

In testimony whereof, I have signed my name hereto.

F. OSCAR RACE.